Sept. 22, 1959 J. R. ANDERSON 2,905,928
FERROELECTRIC STORAGE ARRAY
Filed Sept. 8, 1955

INVENTOR
J. R. ANDERSON
BY
ATTORNEY

United States Patent Office 2,905,928

Patented Sept. 22, 1959

2,905,928

FERROELECTRIC STORAGE ARRAY

John R. Anderson, Berkeley Heights, N.J., assignor to Bell Telephone Laboratories, Incorporated, New York, N.Y., a corporation of New York Application September 8, 1955, Serial No. 533,120

5 Claims. (Cl. 340—173)

Figure 1:
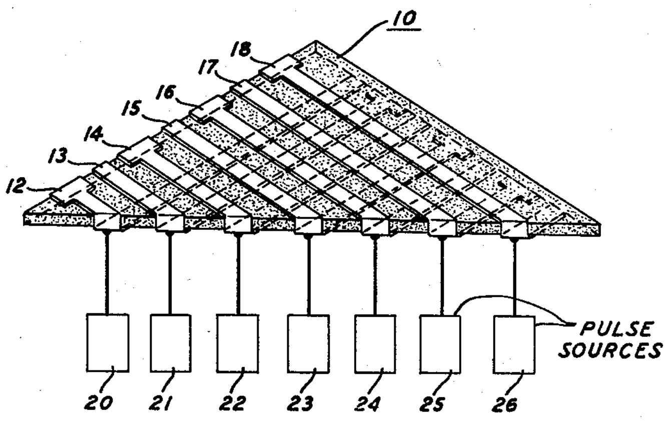

This invention relates to electrical storage mediums for digital information and, more particularly, to ferroelectric storage matrices.

In the prior art, ferroelectric matrices have been disclosed which utilize a crystal such as barium titanate or guanidinium aluminum sulphate hexahydrate to form a rectangular matrix by the application of parallel electrodes on one side of the crystal and separate parallel electrodes on the other side at substantially right angles to the electrodes on the one side. In this type matrix, each electrode on one side forms a storage condenser with each electrode on the other side. Therefore, the number of bits of digital information which may be stored in the matrix is $n^2$ where $n$ represents the number of electrodes on each surface. Utilizing $2n$ leads to connect individual leads to each electrode on each side, the number of bits of information which may be stored per connecting lead will be $$\frac{n}{2}$$

Thus, the larger the matrix, the more efficient the use of connecting leads and switches which control the application of digital information to the matrix. For example, a square matrix of 16 x 16 storage cells will store 256 bits of information or eight bits of information per connecting lead, whereas, a 100 x 100 matrix will store 10,000 bits of information or fifty bits per connecting lead.

It is an object of this invention to provide an improved storage medium.

Another object of this invention is to provide an improved ferroelectric storage medium wherein a bit of information may be stored between each electrode and each of the other electrodes of the matrix.

Still another object of this invention is to provide a ferroelectric matrix which will store a large number of bits of information per connecting lead.

Briefly, in accordance with aspects of this invention, a ferroelectric matrix is formed upon a substantially triangular crystal of ferroelectric material. On one surface of the crystal, conductors are placed substantially perpendicular to one of the sides of the triangle; these conductors are extended around the edge of the hypotenuse of the triangular crystal onto the opposite surface of the crystal forming a substantially right angle with the conductors on the first surface of the crystal, thus defining storage condensers between each electrode and each of the other electrodes.

This utilization of triangular crystals has several practical advantages over the use of rectangular crystals. Square or rectangular crystals require that the crystalline material be cut in that shape. However, barium titanate normally grows in triangular crystals. Therefore, the use of these crystals in their natural shape obviates the necessity for cutting. Thus, the number of operations required to produce the matrix is reduced and the maximum available crystal area is utilized.

Further, the number of bits of information that may be stored for a given number of input leads is larger in matrices in accordance with this invention. For a satisfactory comparison between the storage capacity of a triangular matrix with that of a rectangular matrix, two cases, each requiring different assumptions, should be investigated. The first case assumes a given number of input leads to the selected form of storage matrix and determines the number of bits of information which may be stored in each of the matrices. The second case assumes the total number of bits of information to be stored and from this assumption determines the number of input leads required.

Assuming in the first case that $2n$ leads are to be employed in each matrix, the electrodes on the rectangular matrix will form an $n$ x $n$ array which will store $n^2$ bits of information. The triangular array, however, which utilizes $2n$ leads will store $n^2+n(n-1)$ bits. As $n$ becomes quite large with respect to 1, the number of bits which may be stored in the triangular array approaches $2n^2$ or twice as many bits of information as compared to the rectangular array having the same number of leads.

Under the second assumption we will assume that the total number of bits of information to be stored is $m^2+m(m-1)$. The square matrix required to store this number of bits of information will require a number of leads equal to $$2\sqrt{m^2+m(m-1)}$$

whereas the triangular matrix will require $2m$ leads. By dividing the number of bits of information by the number of leads required in each case, we find that the bits of information stored per lead in the square matrix is $$\frac{\sqrt{m^2+m(m-1)}}{2}$$

whereas in the triangular matrix the number of bits of information stored per lead is equal to $$\frac{m^2+m(m-1)}{2m}$$

In order to make a direct comparison under the second assumption between the number of leads required in the square matrix as compared to the triangular matrix, we divide the expression for the number of leads in a square matrix by the expression for the number of leads in a triangular matrix. This ratio is $$\frac{\text{square leads}}{\text{triangle leads}}=\frac{2\sqrt{m^2+m(m-1)}}{2m}$$

From this relationship, as $m$ becomes quite large with respect to 1, the ratio reduces to $\sqrt{2}$ or 1.41 more leads required in the square matrix than that required in a triangular matrix to store a given number of bits of information.

The establishment of remanent polarization of ferroelectric materials and the reversal of this remanent polarization are accomplished in a manner similar to that described in my Patent 2,717,373, issued September 6, 1955. In that patent as well as in my Patent 2,717,372, issued September 6, 1955, the square hysteresis loop of the ferroelectric material and the transfer of the remanent polarization around this hysteresis loop are described. This transfer is accomplished by the application of a first pulse, for example, $+E_1$ to one electrode of the ferroelectric crystal and the simultaneous application of another pulse $-E_1$ to a complementary electrode of the ferroelectric condenser. To reverse this remanent polarization, a pulse $-2E_1$ is applied to the one electrode of the ferroelectric condenser and a ground or slight positive pulse is applied to the complementary electrode. Alternatively, this reversing pulse might have been equally divided between the two electrodes. Thus, the reversing pulses are equal in magnitude but opposite in polarity to the first pair of pulses. This last-mentioned pair of pulses effectively reverses the remanent polarization of the ferroelectric condenser, thus restoring it to the first remanent state of polarization.

In terms of the storage of binary information, the first state of remanent polarization of the condenser may represent a stored "0" and the opposite state of remanent polarization may represent a stored digit. As explained in connection with the storage and read-out of binary information relative to ferroelectric crystals in my Patent 2,717,372, issued September 6, 1955, an output pulse of small magnitude will be derived from a ferroelectric condenser in response to a read-out pulse if no digit is stored in that condenser as the remanent polarization of the ferroelectric condenser is in a direction to aid the passage of this read-out pulse through the ferroelectric condenser. If, however, a binary digit has been stored in the ferroelectric condenser, the remanent polarization of that condenser will be in a direction to oppose the applied read-out pulse. In response to a read-out pulse, a relatively large output pulse will be derived due to the reversal of the opposing remanent polarization. These output pulses may be detected by any current detecting means which means may conveniently be incorporated in the pulse sources associated with the electrodes of the ferroelectric condensers.

It is a feature of this invention that the electrodes on each side of a ferroelectric crystal are connected together in such a manner that each electrode forms a ferroelectric condenser with each other electrode.

Another feature of this invention is that the electrodes on one surface of a ferroelectric crystal extend around an edge of the crystal and across the other surface of the crystal substantially perpendicular to the electrodes on the first surface, thus forming a ferroelectric condenser between each electrode and each other electrode.

It is another feature of this invention that store pulses of one polarity are applied to a given electrode when this electrode acts as the upper electrode of a condenser, and store pulses of the opposite polarity are applied when this electrode acts as the lower electrode of a condenser.

It is a further feature of this invention to apply read-out pulses of one polarity to a given electrode when this electrode acts as the upper electrode of a condenser and to apply read-out pulses of the opposite polarity when this electrode acts as the lower electrode of a condenser.

Figure 2:
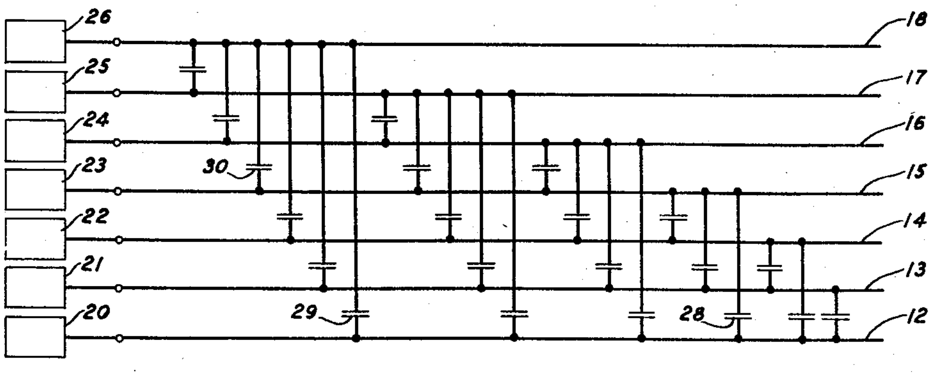

A complete understanding of this invention and of these and other features thereof may be gained from consideration of the following detailed description and the accompanying drawing in which:

Fig. 1 is a perspective view of one specific illustrative embodiment of this invention; and Fig. 2 is a schematic representation of the embodiment of Fig. 1.

Referring now to Fig. 1, there is depicted a triangular ferroelectric crystal 10, in accordance with one specific embodiment of this invention, having a number of electrodes 12 through 18 on each surface. Each electrode 12 through 18 makes a substantially right angle with one edge of the crystal, extends to the hypotenuse of the crystal, down across the hypotenuse to the other surface of the crystal and across this other surface to the other side of the triangle. Thus, each conductor 12 through 18 forms a ferroelectric condenser with each of the other conductors, as shown in Fig. 2, in which condenser 28 represents the ferroelectric storage condenser between conductors 12 and 15. Similarly, condensers 29 and 30 represent the storage mediums between electrode 18 and electrodes 12 and 15 respectively.

While for simplicity only seven electrodes have been shown, it is readily understood that any number of electrodes may be employed, the only requirement being that each electrode extend across each surface of the crystal and thereby form a storage medium with each of the other electrodes.

Conductors may advantageously be attached to the matrix electrodes along the hypotenuse of the ferroelectric crystal as depicted in Fig. 1. Pulse sources 20 through 26 are connected to each of these conductors. The operation of these sources will be subsequently explained.

Inasmuch as each electrode of the triangular matrix appears on both sides of the matrix, a different switching arrangement is required as compared to that of a rectangular ferroelectric matrix. If a bit of information is to be stored between electrode 15 and electrode 12, which combination of electrodes forms condenser 28 as depicted in Fig. 2, a positive pulse $+E_1$ is applied from pulse source 23 to electrode 15 and a negative pulse $-E_1$ is applied to electrode 12 from source 20. If the information stored in condenser 28 is now to be read out, i.e., the remanent polarization reversed, a pulse $-E_1$ is applied to the electrode 15 from pulse source 23 and a pulse $+E_1$ is applied to electrode 12. If now a binary "1" is to be stored in condenser 29, a pulse $-E_1$ is applied to electrode 15 from pulse source 23, and a pulse $+E_1$ is applied to electrode 18 from pulse source 26. It is to be noted that in this instance the store pulse delivered from source 23 is opposite in polarity to the store pulse previously applied from this pulse source in order to store a bit of information in condenser 28. This pulse technique is used because electrode 15 constitutes the upper electrode of condenser 28 while, in forming condenser 30, electrode 15 constitutes the lower electrode. Similarly, in order to read out this bit of information in condenser 30, a negative pulse $-E_1$ is applied from pulse source 26 and positive pulse $+E_1$ is applied from source 23. From the foregoing discussion it is apparent that, at any time when a bit of information is to be stored in a condenser, a positive pulse is applied to the electrode of that condenser on one surface, for example, the top surface of the crystal, and a negative pulse is applied to the complementary electrode on the other or bottom surface. To minimize the disturbing effect of the applied pulses upon the unselected crystals, complementary pulses of $+E_1$ and $-E_1$ are employed for both storage and read out, the polarity being reversed in the latter operation. It is to be understood from the arrangement of the matrix that under operating conditions the storing and reading of information relative to the matrix is advantageously sequentially accomplished, that is, storing or reading out one bit of information at a time. It is further understood that the designations "top" and "bottom" as related to the crystal depend on which direction of remanent polarization is chosen as the normal or zero stored state and the digit stored state, the choice being arbitrary.

It is to be understood that the above-described arrangements are illustrative of the application of the principles of the invention. Numerous other arrangements may be devised by those skilled in the art without departing from the spirit and scope of the invention.

What is claimed is:

1. A ferroelectric matrix including a ferroelectric crystal having electrodes extending across one surface, down across an edge, and across the other surface at an angle to the direction of said electrodes on said one surface, each electrode thereby forming one and only one storage condenser with each other electrode, a conductor connected to each of said electrodes, and pulse means connected to each of said conductors, said last-mentioned means including means for providing store and read-out pulses of either polarity.

2. A ferroelectric storage array comprising a triangular ferroelectric crystal, electrodes extending substantially parallel across one face of said crystal, across one edge of said crystal, and across the other face of said crystal, said electrodes on said other face being at an angle to said electrodes on said one face, thereby forming only a single storage condenser between each electrode and each of the other electrodes, and means for applying pulses of either polarity to each of said electrodes.

3. A ferroelectric storage array comprising a crystal of ferroelectric material, a plurality of electrodes, said electrodes extending on one surface of said crystal, around an edge of said crystal, and across the other surface of said crystal, each electrode thereby forming a single storage condenser with each other electrode, conductors connected to said electrodes, and means including said conductors for applying a pulse of one polarity to one electrode to effect a change of polarization of a storage condenser defined between said one electrode on one surface of said crystal and a second electrode on the other surface of said crystal and for applying a pulse of opposite polarity to effect said same change of polarization of a storage condenser defined between said one electrode on said other surface and a third electrode on said one surface.

4. A ferroelectric storage matrix comprising a triangular crystal of a ferroelectric material, a plurality of electrodes, said electrodes extending parallel to each other on one surface of said crystal from substantially one edge of said crystal to a second edge thereof, extending over said second edge of said crystal, and across the other surface of said crystal substantially to the third edge thereof, each electrode thereby forming a single storage condenser with each other electrode, conductors connected to said electrodes at said second edge, and means including said conductors for applying a pulse of one polarity to one electrode to effect a change of polarization of the storage condenser defined between said one electrode on one surface of said crystal and a second electrode on the other surface of said crystal and for applying a pulse of opposite polarity to effect said same change of polarization of a storage condenser defined between said one electrode on said other surface and a third electrode on said one surface.

5. A ferroelectric storage array comprising a flat triangular ferroelectric crystal substantially in its natural crystallation from, electrodes extending substantially parallel across one face of said crystal, across one edge of said crystal, and across the other face of said crystal, said electrodes on said other face being at an angle to said electrodes on said one face, thereby forming only a single storage condenser between each electrode and each of the other electrodes, and means for applying pulses of either polarity to each of said electrodes.

References Cited in the file of this patent

UNITED STATES PATENTS

| | | |
|---|---|---|
| 2,695,397 | Anderson | Nov. 23, 1954 |
| 2,695,398 | Anderson | Nov. 23, 1954 |

FOREIGN PATENTS

| | | |
|---|---|---|
| 572,089 | Germany | Mar. 10, 1933 |